(12) United States Patent
Singh et al.

(10) Patent No.: US 10,142,996 B2
(45) Date of Patent: Nov. 27, 2018

(54) SENSITIVITY TUNING IN WIRELESS NETWORKS

(71) Applicant: Nokia Technologies Oy, Espoo (FI)

(72) Inventors: Sarabjot Singh, Berkeley, CA (US); Sayantan Choudhury, Berkeley, CA (US); Enrico-Henrik Rantala, Berkeley, CA (US); Namyoon Lee, Walnut Creek, CA (US); Esa Juhani Tuomaala, El Cerrito, CA (US)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 14/791,295

(22) Filed: Jul. 3, 2015

(65) Prior Publication Data

US 2017/0006616 A1    Jan. 5, 2017

(51) Int. Cl.
  *H04W 72/08*    (2009.01)
  *H04W 74/08*    (2009.01)

(52) U.S. Cl.
  CPC ..... *H04W 72/085* (2013.01); *H04W 74/0808* (2013.01)

(58) Field of Classification Search
  None
  See application file for complete search history.

(56) References Cited

U.S. PATENT DOCUMENTS

| | | | |
|---|---|---|---|
| 2007/0286122 A1 | 12/2007 | Fonseca | |
| 2008/0084835 A1* | 4/2008 | Goel | H04W 74/0808 370/310 |
| 2010/0048212 A1* | 2/2010 | Yavuz | H04W 52/244 455/436 |
| 2012/0115488 A1* | 5/2012 | Jiang | H04W 52/325 455/438 |
| 2014/0376453 A1* | 12/2014 | Smith | H04W 74/0816 370/328 |
| 2015/0009907 A1* | 1/2015 | Merlin | H04W 74/0808 370/329 |
| 2015/0181609 A1* | 6/2015 | Nusairat | H04L 5/006 370/329 |
| 2016/0007350 A1* | 1/2016 | Xiong | H04W 24/10 370/252 |

(Continued)

FOREIGN PATENT DOCUMENTS

WO    2015089229 A1    6/2015

OTHER PUBLICATIONS

Communication with extended European Search Report in EP16168711.6 dated Nov. 7, 2016.

(Continued)

*Primary Examiner* — Jamal Javaid
*Assistant Examiner* — Rosene Clark
(74) *Attorney, Agent, or Firm* — Banner & Witcoff, Ltd.

(57) ABSTRACT

An access point in a random access wireless network is presented, which performs medium access control for transmissions from a plurality of stations to the access point using a carrier sense multiple access protocol. The CSMA protocol is based on the access point having a variable sensitivity level to detecting other transmissions on a wireless channel in order to avoid data collisions. In a dense network environment, the sensitivity level can be reduced to avoid detecting transmissions to other access points, and thus improve area efficiency.

17 Claims, 11 Drawing Sheets

(56) References Cited

U.S. PATENT DOCUMENTS

| | | | |
|---|---|---|---|
| 2016/0081031 A1* | 3/2016 | Barriac | H04W 52/0261 370/311 |
| 2016/0081056 A1* | 3/2016 | Barriac | H04L 43/0882 370/252 |
| 2016/0087826 A1* | 3/2016 | Huang | H04L 27/0006 375/316 |
| 2016/0088618 A1* | 3/2016 | Barriac | H04W 74/0816 370/329 |
| 2016/0100433 A1* | 4/2016 | Vajapeyam | H04B 17/318 370/329 |
| 2016/0112969 A1* | 4/2016 | Zhou | H04W 24/08 370/252 |

OTHER PUBLICATIONS

Mhatre, et al., "Interference Mitigation Through Power Control in High Density 802.11 WLANs", INFOCOM 2007, 26th IEEE International Conference on Computer Communications, May 1, 2007, pp. 535-543.

\* cited by examiner

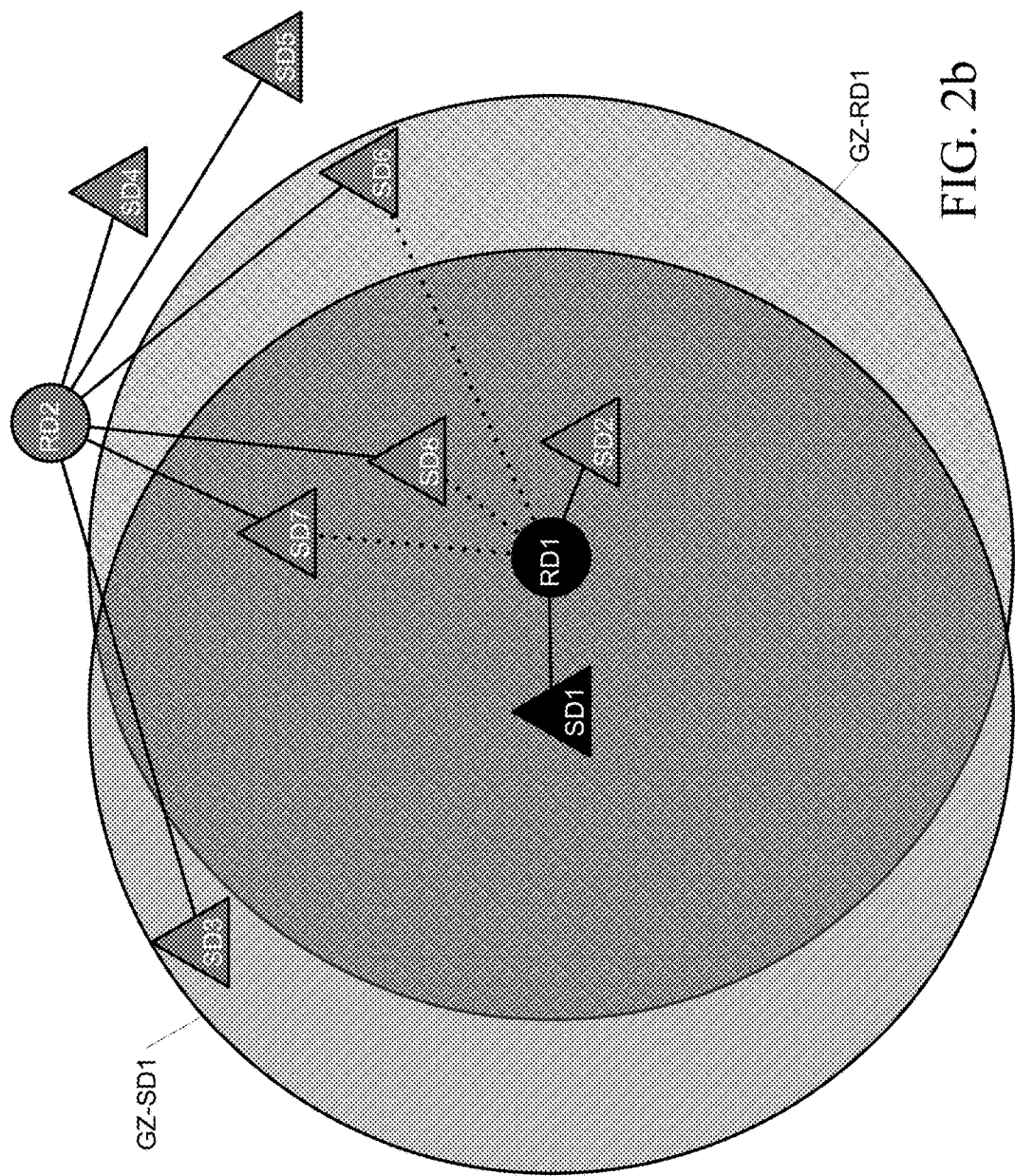

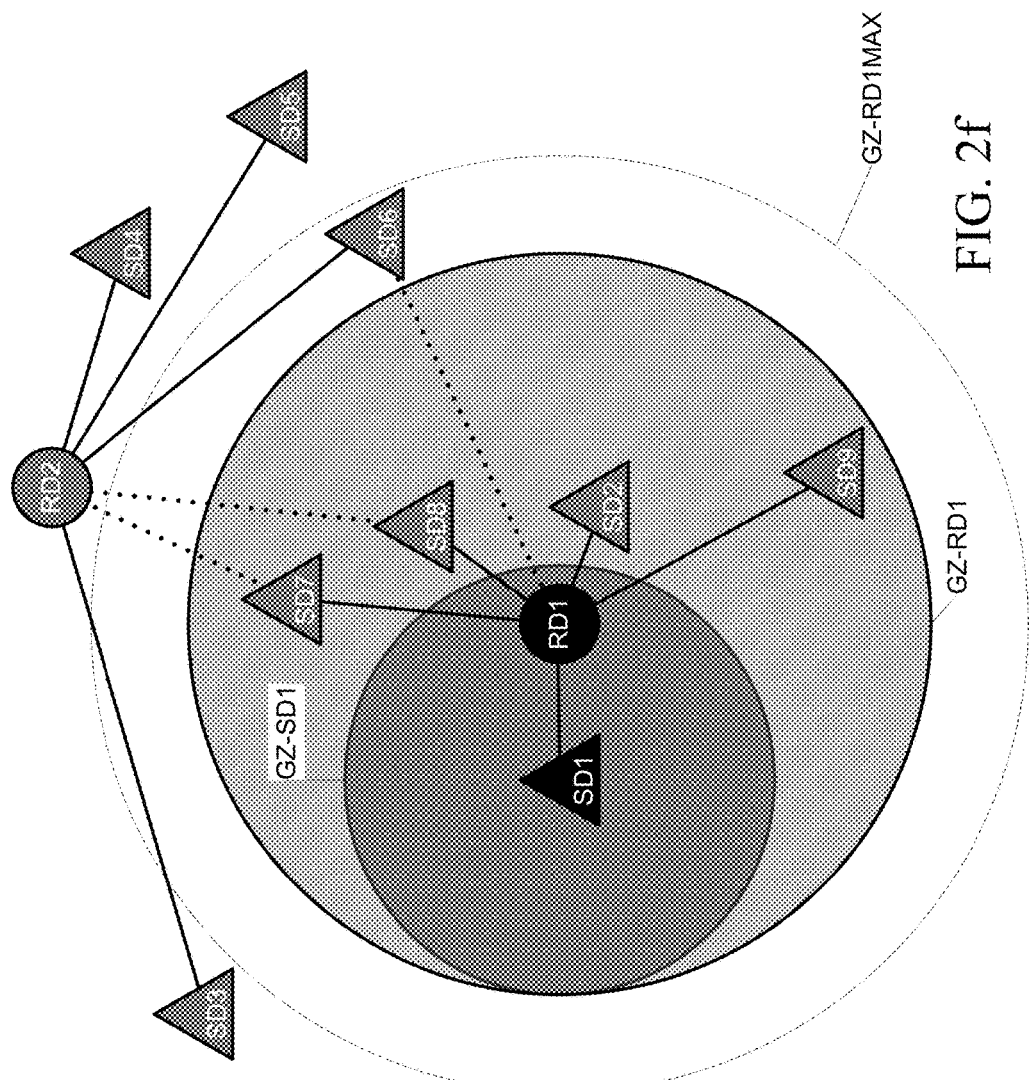

SENSITIVITY TUNING IN WIRELESS NETWORKS

BACKGROUND

A multi-access network in which multiple devices share a common medium for communications may provide medium access control (MAC) through a process of spectrum or carrier sensing. To implement such a spectrum-sense network, devices sense whether other devices are using a shared spectrum of the medium (e.g., by detecting a carrier wave) as a means of avoiding interference. Carrier sensing may be performed at both the sender device and recipient device. For example, before a sender may transmit a message, the sender or recipient or both may be required to first listen for communications on the shared spectrum, and only after the listening devices detect that the shared spectrum is idle, permit the sender to subsequently proceed to transmit its data.

The particular MAC mechanism being used when multiple devices (e.g., access points and wireless stations) are located within a limited region may affect area spectral efficiency. For example, with spectrum sensing the sensitivity with which a sender device or recipient device senses whether a channel is idle determines how far other devices have to be for their transmissions to be detected. The disclosure below presents various aspects of improving channel resource usage in wireless network systems by improving area spectral efficiency.

BRIEF SUMMARY

This Summary is provided to introduce a selection of concepts in a simplified form that are further described below in the Detailed Description. This Summary is not intended to identify key features or essential features of the various embodiments, nor is it intended to be used to limit the scope of the claims.

Embodiments include a recipient device (e.g., a device intended to receive data) that performs medium access control in a random access network for transmissions from a plurality of sender devices (e.g., devices having data to transmit) to the recipient device using spectrum sensing. The protocol is based on the recipient device having a variable sensitivity level to detecting other transmissions within a wireless spectrum in order to avoid data collisions. In a dense network environment, the sensitivity level can be reduced to avoid detecting transmissions to and from other recipient devices, which enables channel reuse in different locations, and thus, improves area efficiency.

Various embodiments include reducing a detection region around a recipient device to the smallest footprint that includes all sender devices presently associated with the recipient device or that includes only a subset of the associated sender devices scheduled for transmissions.

Further embodiments include periodically increasing a recipient device's sensitivity to a maximum value to improve the capability of new sender devices to associate with the recipient device.

Other aspects are discussed further below.

BRIEF DESCRIPTION OF THE DRAWINGS

Certain embodiments are illustrated by way of example and not limited in the accompanying figures in which like reference numerals indicate similar elements and in which:

FIGS. 2a-2f illustrate block diagrams of different states of an example communication system in which one or more embodiments may be implemented.

DETAILED DESCRIPTION

Figure 1:
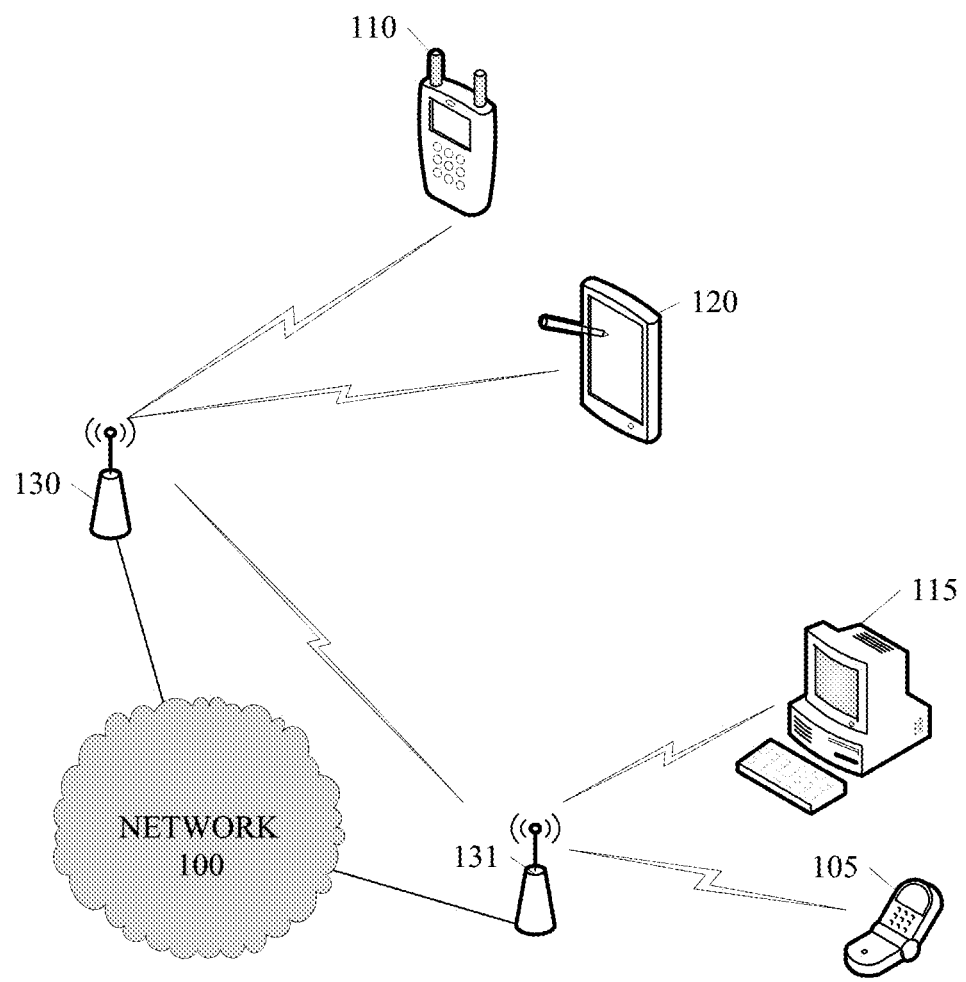
FIG. 1 is a block diagram of an example communication system in which one or more embodiments may be implemented.

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

In wireless random access network systems, such as a wireless local area network WLAN defined by IEEE 802.11, medium access control (MAC) may be used to enable multiple devices to share a common channel in a distributed manner through use of spectrum sensing protocols, such as the carrier sensing multiple access (CSMA) protocol used in some IEEE 802.11 systems. One example of using spectrum sensing for collision avoidance (CA) is for each device to first listen to a channel to see if it detects any transmissions, and if the channel is in use, to defer its transmission for a period of time. Spectrum sensing, however, is vulnerable to packet collision caused by hidden nodes, especially in a dense network environment.

To resolve the hidden node problem, various embodiments may incorporate spectrum sensing at the recipient and/or sender, optionally with a handshaking protocol between the two, such that transmissions from the sender to the recipient occur only after the recipient or both the sender and recipient sense that the channel is idle. In some embodiments, the handshaking may be implemented using a Request-to-send/Clear-to-send (RTS/CTS) or similar type flow control signaling as used in the IEEE 802.11 family of standards.

A fundamental throughput bottleneck of spectrum sensing, such as in CSMA collision avoidance (CSMA-CA) being used in the current WLAN (i.e., IEEE 802.11 a/b/n/ac) is the excessive medium resource waste for the channel access. In particular, the throughput decreases as the number of devices that contend for channel access increases in a particular geographic area. Multiple sender and recipient devices (e.g., access points and wireless stations) may be located within a limited area. The sensitivity with which a sender or recipient device senses whether a channel is idle determines how far other devices have to be for their transmissions to be detected by the sender or recipient device. The lower the sensitivity threshold (e.g., the lower the energy) with which a device decides that another device is transmitting in the channel effectively increases the distance that the other device can be and still be detected. This effectively creates a guard zone around each device in which the device is prevented from using the channel (to send and/or receive data) when another device in the guard zone is transmitting in the channel. The lower the threshold the greater area the guard zone covers. This may create a problem in dense network environments by restricting devices from reusing the medium at distances that are far enough as to not interfere with a sender device transmitting data, but are nonetheless within the sender device's guard zone.

Various embodiments disclosed herein improve channel resource usage in wireless networks (e.g., WLAN, adhoc, etc.) by, among other things, increasing spatial reuse of a wireless channel (e.g., direct sequence spread spectrum (DSSS) channel, orthogonal frequency division multiplexing (OFDM) channels, etc.). FIG. 1 illustrates an example of one such system through which various embodiments may be practiced. As seen in FIG. 1, the system may include multiple recipient devices (RD) (e.g., access points) 130 and 131 and a number of sender devices (SDs) (e.g., wireless stations) 105, 110, 115, and 120. Each recipient device may be associated with a plurality of sender devices to form a group of devices that communicate together (e.g., an independent or infrastructure basic service set (BSS)). For example, RD 130 and SDs 110 and 120 may form a first communication group (e.g., first BSS) and RD 131 and SDs 105 and 115 may form a second communication group (e.g., second BSS). While the RD (e.g., an access point) of each communication group may cover different geographical areas (e.g., basic service areas (BSAs)), the communication groups may also cover some common locations such that the communication groups are overlapping (e.g., overlapping BSS (OBSS)). For overlapping communication groups, an SD may be associated with one RD, but be within communication range of another RD such that it could switch from the first communication group (e.g., a first BSS) to the second communication group (e.g., a second BSS). While devices may be described herein as a sender device or a recipient device for convenience, such devices may be capable of bi-directional data transmissions and may include transceivers as opposed to just transmitters or receivers. These devices described as sender devices and recipient devices may switch roles to operate as recipient devices and sender devices respectively to support other data transactions in various embodiments (e.g., downlink transmissions from an access point to a station, broadcast transmissions from a central device to multiple remote devices, etc.).

Figure 2A:
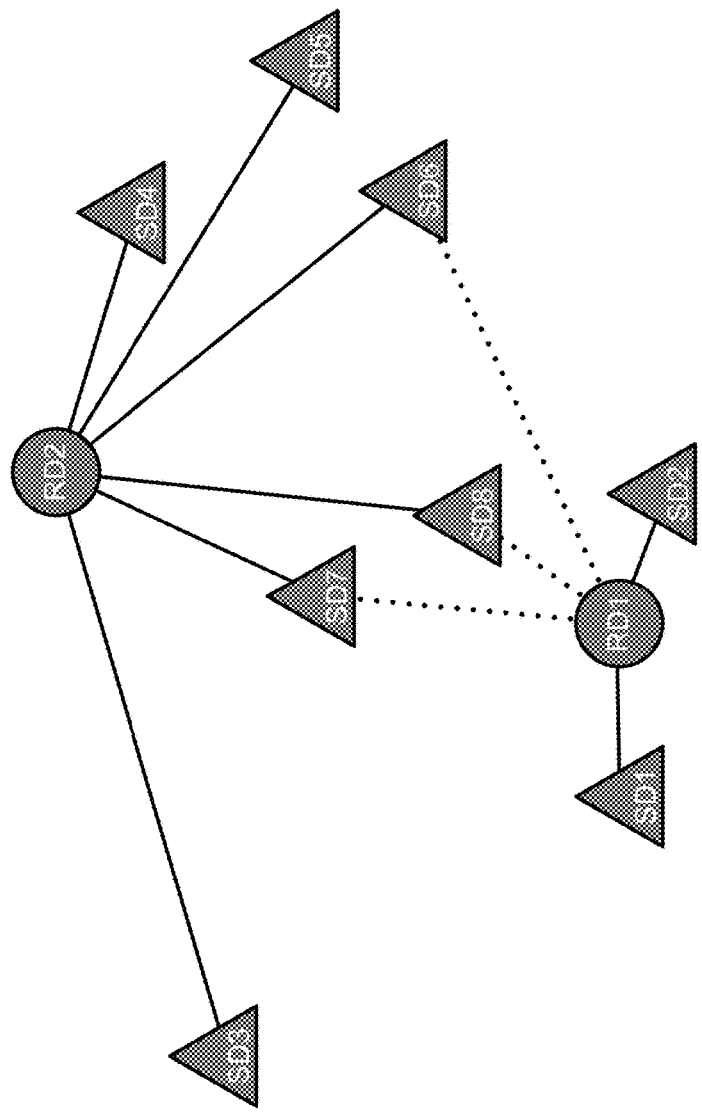

FIG. 2a provides another view of an overlapping communication group configuration with a first communication group (e.g., first BSS) formed by SD1 and SD2 associated with RD1, and a second communication group (e.g., second BSS) formed by SD3-SD8 associated with RD2. A solid line between an SD and an RD indicates a group association, and a dotted line between an SD and an RD indicates that the SD could be associated with the RD because the SD is within the communication area (e.g., BSA) of the RD.

FIG. 2b illustrates the system of FIG. 2a in the circumstance where SD1 initiates a transmission using spectrum sensing (e.g., CSMA) to send buffered data to RD1 in the first communication group according to various embodiments.

The area spectral efficiency in the random access wireless network is determined, at least in part, by the spectrum sensing (e.g., CSMA or CSMA/CA) protocol used for medium access control (e.g., in IEEE 802.11 based Wi-Fi networks). The spectrum sensing protocol relies on the SD or RD overhearing transmissions as a means of avoiding interference to ongoing transmissions. Specifically, an RD and/or SD (e.g., SD1 or RD1 in FIG. 2a), prior to transmitting buffered data, senses the channel (e.g., OFDM channel), and transmits only if the channel is adjudged to be idle, e.g., the detected energy on the channel is below a predetermined sensitivity threshold, such as a Clear Channel Assessment (CCA) threshold. The sensitivity threshold may be relative to various properties (or combinations of properties) of the channel, such as detecting whether a carrier signal of the channel has an amplitude (e.g., RMS or peak) above a predetermined sensitivity (e.g., CCA) threshold value or whether energy detected (or sensed) in the channel is above a predefined sensitivity (e.g., CCA) threshold (e.g., a carrier signal detected above −82 dBm and/or an energy threshold above −62 dBm for 20 MHz OFDM transmission would indicate that another device is transmitting in the channel).

Various embodiments effectively create an RF-energy based guard zone around each sender device or recipient device (e.g., GZ-SD1 around SD1 and GZ-RD1 around RD1 in FIG. 2b). The size of the guard zone depends on the level to which the sensitivity threshold is set, i.e., a lower sensitivity threshold results in smaller/lower energy signal being detected, which results in detecting transmitters farther away (a larger guard zone). In FIG. 2b for example, SD1 would be able to detect any transmission inside GZ-SD1 (e.g., from RD1, SD2, SD3, SD7, and SD8), and RD1 would be able to detect any transmission inside GZ-RD1 (e.g., from SD1, SD2, SD6, SD7, and SD8).

In one example, prior to transmitting buffered data from SD1 to RD1, both devices may try to detect transmissions within each of their respective guard zones, and if no other transmissions are detected, proceed to transmit the buffered data from SD1 to RD1. However, if SD3, SD6, SD7, or SD8 were transmitting to RD2 in the second communication group (e.g., BSS), the guard zones would prevent SD1 and RD1 in the first communication group (e.g., BSS) from reusing the medium (e.g., OFDM channel), even though the detected transmissions in the second communication group (e.g., BSS) may not be sufficiently strong to interfere with transmission in the same channel between SD1 and RD1. This reduction in the special efficiency is exasperated in a dense network environment (e.g., in an apartment building, office building, etc.) where several RDs may be located in close proximity. Various embodiments, however, may improve the spatial efficiency by varying the size of the guard zones, e.g., by changing the sensitivity (e.g., CCA) thresholds in the RD independent of the sensitivity (e.g., CCA) threshold in the SD, or by changing the sensitivity (e.g., CCA) thresholds in the RD in combination with changing the sensitivity (e.g., CCA) threshold in the SD, in the process of uplink transmissions to the RD (e.g., from SD1 to RD1).

Figure 2C:
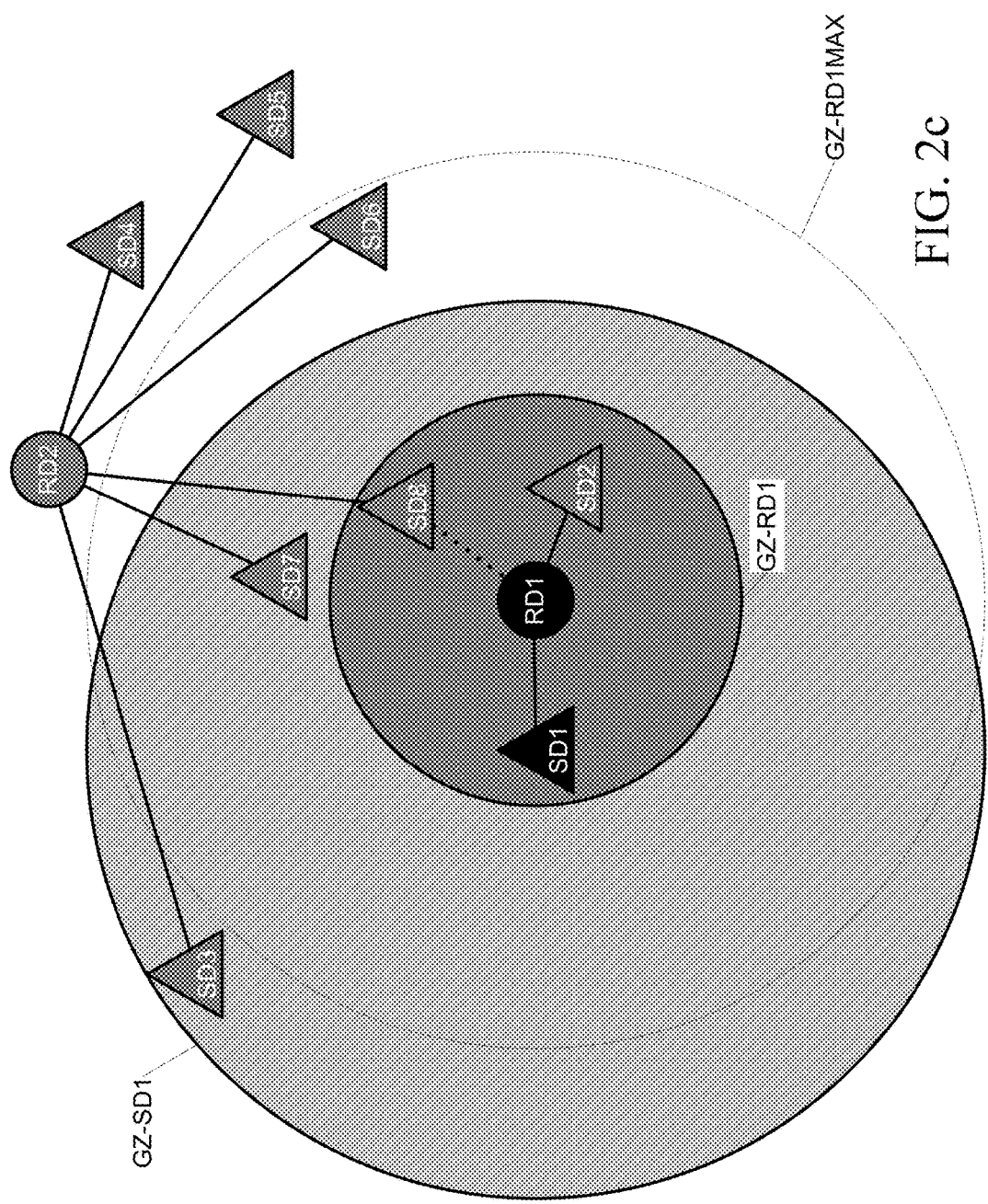

FIG. 2c illustrates one embodiment in which an RD (e.g., RD1) reduces the size of its guard zone in response to SD initiating an uplink (e.g., from SD1 to RD1) transmission, thereby moving one or more SDs out of the restricted area. The dotted circle illustrated in FIG. 2c indicates, for example, a maximum guard zone GZ-RD1MAX associated with the minimum sensitivity (e.g., CCA) threshold for RD1. Note however that not all non-RD1 associated SDs maybe outside RD1's guard zone. For example, in FIG. 2c, SD8 remains within the guard zone, and thus could block reuse of the channel by SD1/RD1. Such blocking could be because RD1 is receiving and inadvertently decoding the transmissions from SD8, even though it is not associated with RD1, and thereby preventing RD1 from receiving transmissions from its associated SD1. In another respect, the blocking could be through SD1/RD1 performing spectrum sensing (e.g., CSMA/CA), in which SD1 or RD1 detects that SD8 is transmitting on the channel, and based on the detection, waits for the channel to become available.

Figure 4:
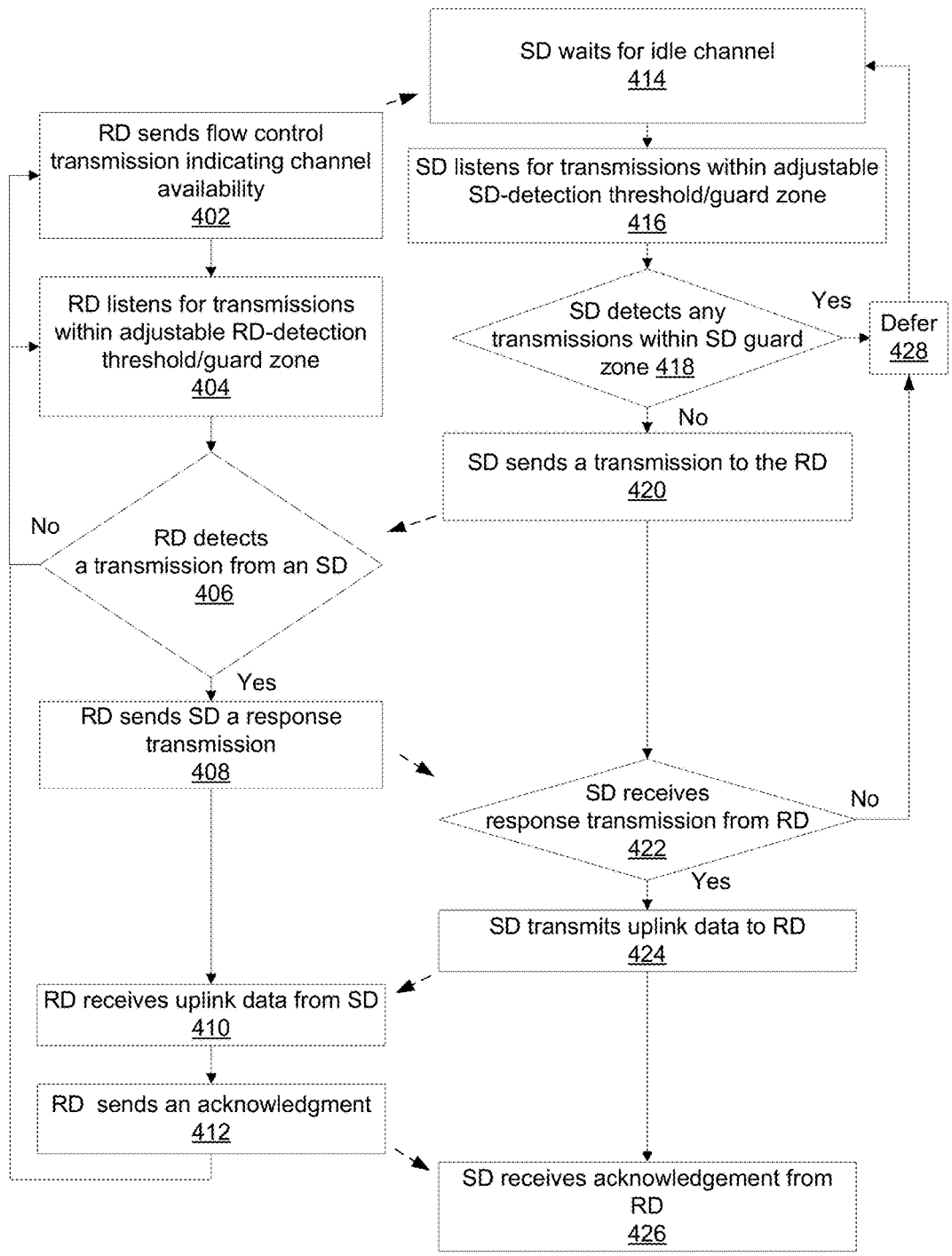
FIGS. 4-5 illustrate example processes according to one or more embodiments described herein.

FIG. 4 illustrates a process according to various embodiments using spectrum sensing (e.g., CSMA/CA) in conjunction with a variable sensitivity (e.g., CCA) threshold of an RD and/or variable sensitivity (e.g., CCA) threshold of an SD.

Steps 402 through 412 represent steps that may be performed by an RD or other central device that has a plurality of SDs or remote devices associated with it. Steps 414 through 428 represent various processes that may be performed by an SD or other remote device that is communicating with and RD.

In step 402, the RD may send a flow control transmission intended for other devices (e.g., associated and non-associated SDs and other RDs) within transmission range indicating the availability or unavailability of a shared communication channel. The flow control transmission, for example, could be an RTS, CTS, or Acknowledgment (ACK) transmission directed to a particular SD during a particular previous uplink or downlink data transaction, or the flow control transmission could be an initiation of a new uplink data transaction. The flow control transmission may include network allocation vector data informing other devices within listening distance indicating how long the channel will be busy with the particular transaction.

During periods where the RD knows the channel to be idle, the RD in step 404 listens for transmissions in the channel within the RD's sensitivity threshold (e.g., CCA threshold) or guard zone from other devices. Step 404 may include evaluating any transmissions received on the RD's antenna and comparing the transmissions to the sensitivity threshold. The transmissions that are below the sensitivity threshold (e.g., signal power below a power threshold) or that otherwise fail to meet the threshold requirements (e.g., have a bit-error-rate above a particular sensitivity threshold) may be ignored or discarded. The transmissions that are above the threshold or otherwise meet the threshold requirements are further processed (e.g., demodulated, decoded, interpreted, etc.). Step 404 may include varying the sensitivity threshold (varying the size of the guard zone) to different values at different times of operation as illustrated, for example in FIGS. 2b-2f. For example, the sensitivity threshold may be reduced for a first period of time thereby increasing the size of the guard zone to allow SDs and the RD to discover and associate with other devices (e.g., other RDs or SDs), and then the sensitivity threshold may be increased during a second period of time thereby reducing the size of the guard zone to reduce interference from more distant devices (e.g., devices within the guard zone during the first period of time but beyond the reduced size guard zone during the second period of time). In some embodiments, step 404 may include reducing the guard zone/increasing the sensitivity threshold to include in the guard zone devices at a distance less than the furthest associated SD from the RD, or to include in the guard zone devices at a distance less than the furthest associated SD that is scheduled to communicate with the RD. Further embodiments may include increasing the guard zone to a maximum size/decreasing the sensitivity threshold to a minimum value (maximum operating range of the RD's receiver). In some embodiments, the guard zone refers to a coverage area of a wireless network. In some embodiments, the RD comprises or is comprised in an access point of the wireless network and the SD comprises or is comprised in a station of the wireless network. In various embodiments, the wireless network comprises a basic service set including an access point and one or more stations. Additional aspects of varying the RD sensitivity threshold/guard zone are further discussed below.

As a result of step 404, the RD determines in step 406 if it detects a transmission (e.g., flow control message) from an SD that is associated with the RD. In some embodiments, the transmission (e.g., flow control message) may indicate that the SD has data to transmit to the RD (e.g., a station transmits an RTS message to an access point to request permission to uplink data to the access point). Step 406 may additionally or alternatively include receiving flow control (or handshaking) transmissions (e.g., messages) from SDs not associated with the RD, such as from an SD initiating an authentication or new association with the RD. Such embodiments may include receiving transmissions (e.g., control messages) initiating SD authentication and/or association with the RD during a first period of time when the guard zone has been increased (sensitivity threshold decreased) as in FIGS. 2b and 2e, and receiving transmissions (e.g., control messages) initiating a data transaction (e.g. uplinking buffered data) from associated SDs during a second period of time when the guard zone has been decreased (sensitivity threshold increased) as in FIGS. 2c, 2d, and 2f. If the RD did not detect a (e.g., a flow control message) in its guard zone at step 406, the RD returns to steps 402 (e.g., if the RD has something to transmit) or step 404 (e.g., if the RD has nothing to transmit).

If in step 406 the RD detects a transmission (e.g., a flow control message) from an SD, it proceeds to step 408 in which the RD transmits to the SD a response transmission, which may be another (e.g., second) flow control message. For example, an access point may transmit a CTS message to a station to indicate to the station that it may transmit its data and to indicate to all other stations within listening range of the CTS message that the channel is busy). Subsequently, the RD may receive uplink data from the SD in step 410 and transmit an acknowledgment transmission (e.g., a third flow control message) to the SD in step 412. The acknowledgement transmission may indicate, for example, that the SD received the data correctly and/or that the channel is once again idle.

An SD having data to communicate with its associated RD may perform steps 414-428 in conjunction with the RD performing steps 402-412. In step 414, the SD may wait for the channel to be idle based on, for example, receiving transmissions (e.g., flow control messages) from the RD the SD is associated with, from other RDs, or other SDs, which indicate that the channel is busy (e.g., receiving RTS and CTS messages that include network allocation vector information). Step 414 may be in response, for example, to flow control information transmitted in step 402 (as indicated by the dashed arrow between 402 and 414).

In step 416, an SD having data to uplink to an RD may listen for transmissions (e.g., flow control messages) on the channel within its SD guard zone, which may include measuring properties of transmissions on the channel (e.g. signal strength, power) and comparing the measured properties to its SD sensitivity threshold. Step 416 may include evaluating any transmissions received on the SD's antenna and comparing the transmissions to the SD sensitivity threshold. The transmissions that are below this sensitivity threshold (e.g., signal power below a power detection threshold) or that otherwise fail to meet the threshold requirements (e.g., have a bit-error-rate above a particular error threshold) may be ignored or discarded. The transmissions (e.g., messages) that are above the threshold or otherwise meet the threshold requirements are further processed (e.g., demodulated, decoded, interpreted, etc.). Step 416 may include varying the SD sensitivity threshold (varying the size of the guard zone) to different values at different times of operation as illustrated, for example in FIGS. 2b-2f. For example, the sensitivity threshold may be reduced for a first period of time thereby increasing the size of the guard zone to allow the SD to discover and optionally associate with an unassociated RD, and then the SD sensitivity threshold may be increased during a second period of time thereby reducing the size of the guard zone to reduce interference from more distant devices (e.g., devices within the SD guard zone during the first period of time but beyond the reduced size SD guard zone during the second period of time). In some embodiments, step 416 may include reducing the guard zone/increasing the sensitivity threshold to include in the guard zone devices at a distance less than the associated RD from the SD. Further embodiments may include increasing the guard zone to a maximum size/decreasing the sensitivity threshold to a minimum value (maximum operating range of the SD's receiver). Additional aspects of varying the SD sensitivity threshold/guard zone are further discussed below.

Based on step 416, the SD may detect whether there are any other devices transmitting on the channel within the SD's guard zone. If in step 418 the SD detects a device transmitting on the channel (e.g., by previously receiving a flow control message), the SD proceeds to step 428, in which it defers transmitting its data for a period of time before starting the process over. If the SD did not detect any devices transmitting within its guard zone in step 418, the SD proceeds to step 420 in which the SD may send a transmission to the RD, may be for example, a flow control message that indicates that the SD has data to transmit to the RD (e.g., a station transmits an RTS message to an access point to request permission to uplink data to the access point). The transmission (e.g., a first flow control message) sent by the SD in step 420 may be the same as the transmission received by the RD in step 406 (as indicated by the dashed arrow between steps 420 and 406). In response the transmission sent in step 420, the SD determines if it receives a response transmission (e.g., a second flow control message) from the RD in step 422, such as the one sent by the RD in step 408 described above. The SD may apply in step 422 the same sensitivity thresholds as in step 418. If no response transmission is received, the SD may proceed to step 428 to defer its data transmission. If the response transmission is received from the RD, such as the transmission sent in step 408 (as indicated by the dashed arrow between steps 408 and 422), the SD may proceed to transmit data (e.g., buffered uplink data) to the RD. This data may be the same as the data received by the SD in step 410 (as indicated by the dashed arrow between steps 424 and 410). After sending the data, the SD may optionally receive an acknowledgement transmission (e.g., a third flow control message) from the RD in step 426, which may be the transmission sent in step 412 (as indicated by the dashed arrow between steps 412 to 426). As noted above, various aspects are directed to determining the size of the guard zone, or equivalently setting the RD receiver sensitivity by adjusting the level of the sensitivity threshold (e.g., in step 404 and/or 416). In one aspect, the RD sensitivity threshold is set such that the guard zone is reduced, but not smaller than an area that includes each SD associated with the RD in the communication group (e.g., BSS). In some embodiments, the guard zone may be reduced to the minimum area (or sensitivity threshold increased to the maximum value) below which would exclude one of the SDs in the RD's communication group (e.g., BSS) from being within the guard zone. FIG. 2c illustrates this scenario in that GZ-RD1 is reduced in size until the boarder of the guard zone falls just outside of SD1, which is the furthest SD from RD1 (or the SD with the poorest quality signal) in the communication group (e.g., BSS).

The adjusting of the RD sensitivity threshold to keep all of the SDs in the communication group (e.g., BSS) within range of the RD may be based on detecting a channel quality between the RD and each SD in the communication group (e.g., BSS). In some embodiments, channel quality may be based on a received signal strength (e.g., as indicated by a received signal strength indicator (RSSI)) for transmissions received by the RD from each SD in the communication group (e.g., BSS). For example, the RD sensitivity threshold may be based on the worst RSSI among all SD's associated with the RD, e.g., a sensitivity (e.g., CCA) threshold may be set such that signals from the SD with the worst RSSI can be received by the RD. In another example, the RD's sensitivity threshold may be based on the worst RSSI among a subset of the associated SD's. The subset may be those SD's scheduled to communicate with the RD. For example, a schedule may be set based on a restricted access window (RAW) concept (e.g., each SD is assigned a finite time slice in which they are permitted to transmit) or on multi-user scheduling (e.g., OFDM or MU-MIMO). The scheduling, in some embodiments, may be based on whether or not each SD has uplink data (e.g., in uplink buffers) ready to transmit to the RD.

The indication of received signal strength (e.g., RSSI) or other indication of channel quality may be calculated by the RD directly (e.g., by implicit estimation of the RSSI through control packets). In other examples, the RSSI or other channel quality indicator may be obtained by explicit feedback from each associated SD to the RD. For example with MIMO transmissions, a sufficiently accurate RSSI or other channel quality indicator may be based on multiple antenna transmissions. In one example, a training or sounding packet may be sent from the RD to the SD so that each SD may estimate the channel quality (e.g., based on signal strength, frequency selective fading of subcarriers, etc.), and report back the estimated channel quality to the RD. For example, the RSSI could be piggybacked in control messages.

The estimate of RSSI at the RD from each SD can be obtained from any data or control packet. For better reliability, in some embodiments the RSSI could be averaged over a certain interval.

In various embodiments, the RD may be configured to a minimum default Sensitivity Threshold (e.g., −82 dBm power), and then increase the Sensitivity Threshold to:

$$\text{Sensitivity Threshold} = \min(RSSI_k) - M \quad (1),$$

where $RSSI_k$ is the RSSI indicating the received signal strength from the kth SD associated with the RD. M may be an added safety margin. The "min" may be taken over all the associated SDs or only over all scheduled SDs. For example, an RD may be associated with three SDs, and the RSSI for each may be −15 dBm, −27 dBm, and −39 dBm, respectively. A safety margin, for example, of −20 dB may be selected. The sensitivity threshold according to the above formula may, thus, be selected to be: Sensitivity Threshold=−39 dBm−20 dBm=−59 dBm. In one variation, in response to the RD not expecting any scheduled transmission, the RD may revert to taking the "min" over all associated SDs. However, in response to the RD expecting a scheduled uplink transmission, the "min" could be applied based only on the SDs of the scheduled set.

Figure 2D:
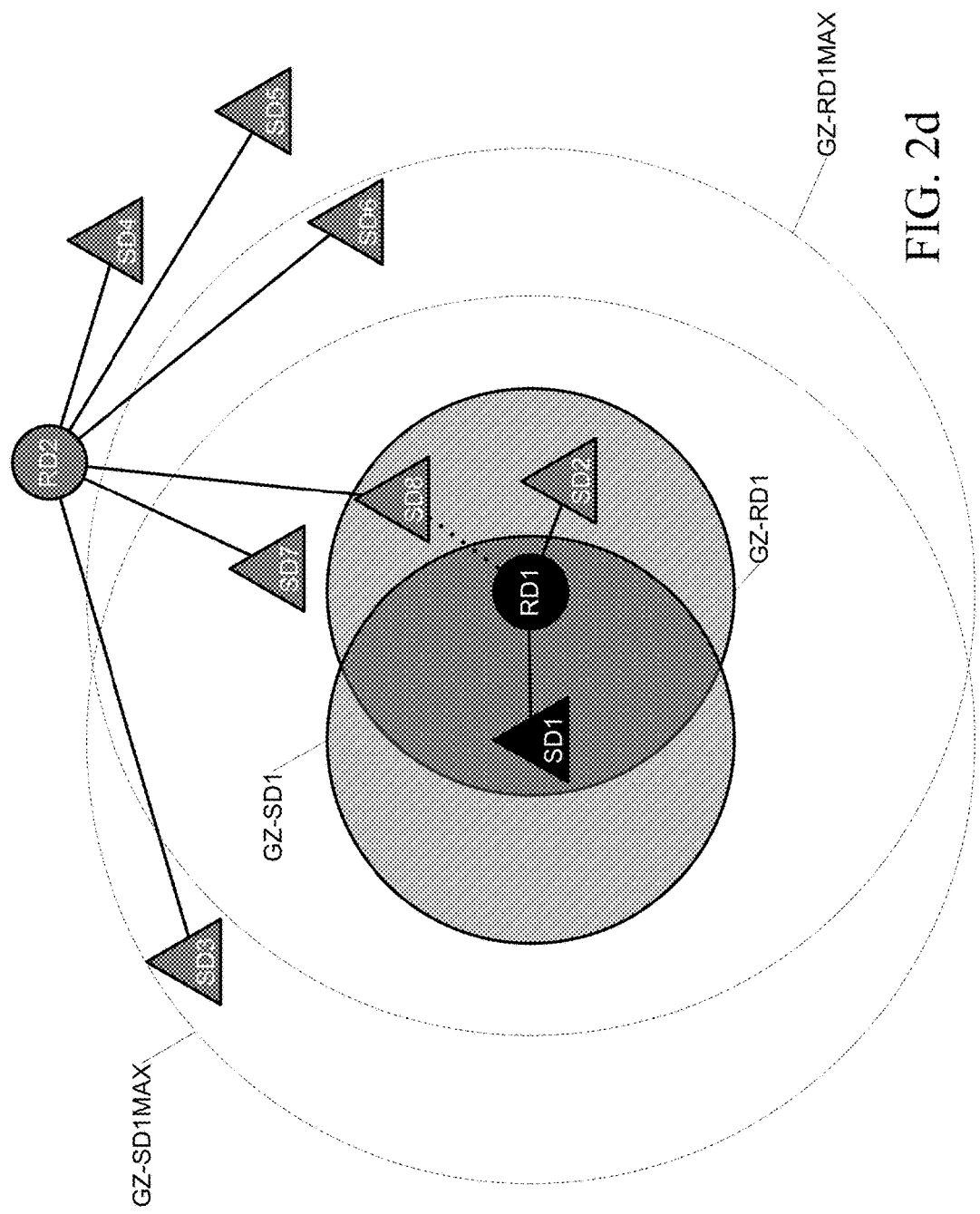

In some embodiments, in addition to the RD reducing the size of its guard zone during a data uplink from an SD, the SD transmitting the uplink may also reduce the size of its guard zone as shown in FIG. 2d. In comparing FIG. 2d to FIG. 2c, the reduction of the SD guard zone provides further increases in area efficiency by removing additional unassociated SDs (e.g., SD3 and SD7) from those that would block uplink transmission from SD1 to RD1. In some variations, the SD's reduction in its guard zone for uplink transmission may be performed as part of step 418 in FIG. 4 prior to the SD comparing the channel measurements to the SD-CCA threshold.

Figure 2E:
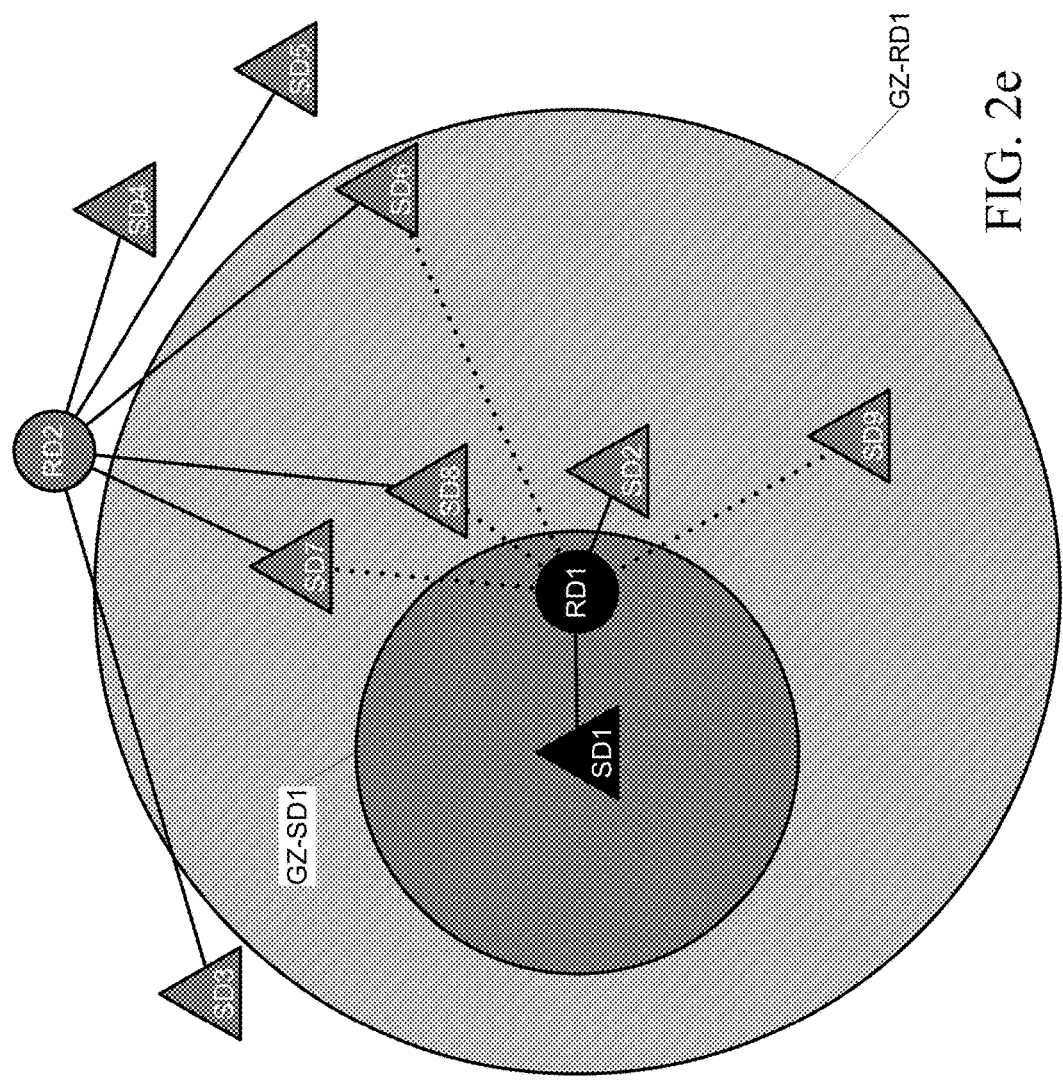

To allow new SDs or otherwise unassociated SDs to reliably associate with an RD, the RD (e.g., RD1) may revert back to a minimum or default receiver sensitivity (maximum guard zone) periodically as illustrated in FIG. 2e. In FIG. 2e, SD9, which is newly within the guard zone (e.g., BSA) of RD1 (e.g., a mobile device traveling within range of RD1), is illustrated with a dotted line indicating that it could associate with RD1. Also shown with dotted lines to RD1 are SD6, SD7, and SD8 which indicates that these SDs could switch their association from RD2 to RD1. After a certain time period, in which the eligible SD's have associated or decided not to associate with RD1, RD1 may once again reduce the size of its guard zone by decreasing its receiver's sensitivity level (e.g., increasing its CCA threshold) as shown in FIG. 2f. As shown in FIG. 2f, SD7 and SD8 switch their association from RD2 to RD1, and newly arrived SD9 is also associated with RD1. Since in this example SD9 is the furthest (or had the lowest RSSI), RD1 reduced its receiver sensitivity such that boundary of the RD guard zone lies just beyond SD9, but no further.

Figure 3:
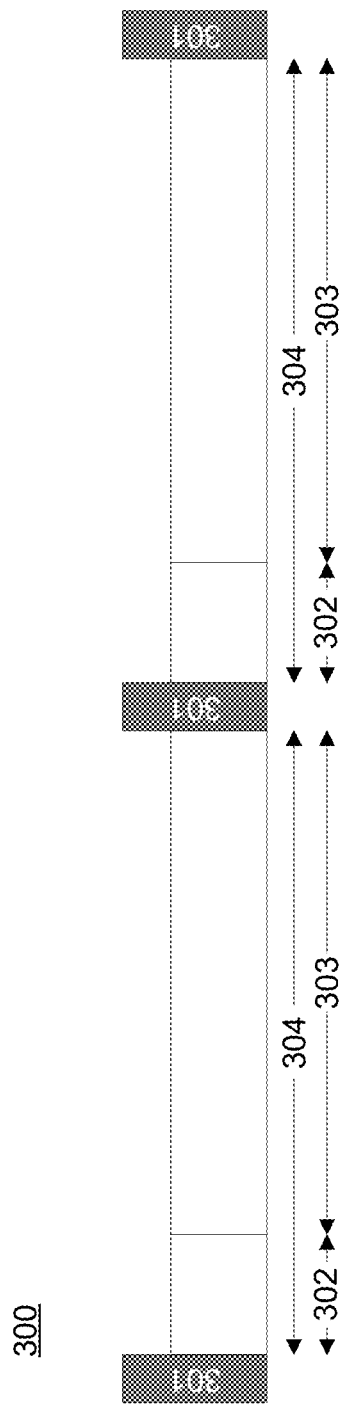
FIG. 3 illustrates an example timing diagram according to one or more embodiments described herein.
Figure 5:
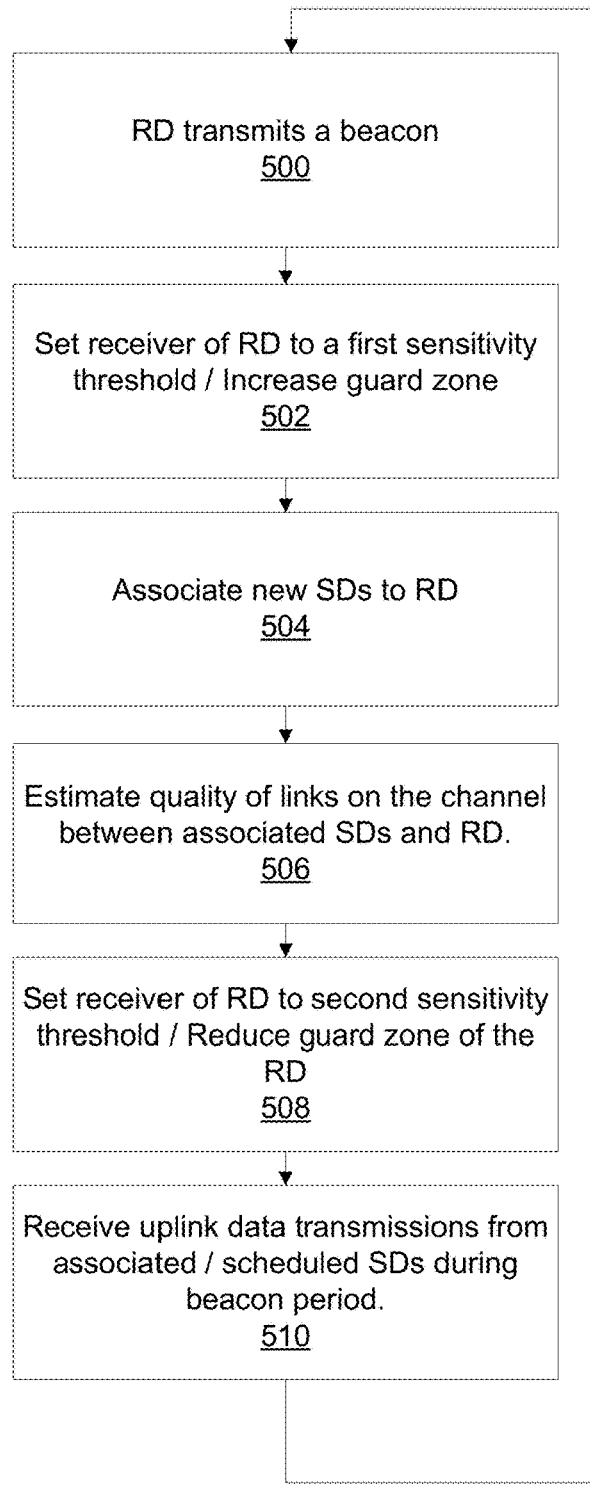

FIG. 3 illustrates and example time sequence of, and FIG. 5 illustrates a process by which, the RD periodically (e.g., during a beacon period) increases and decreases its sensitivity level as shown in FIGS. 2e and 2f. As shown in FIG. 3, the period (e.g., beacon period) may be synchronized with the Target Beacon Transmit Time (TBTT) 304.

In this embodiment, The RD may transmit a beacon (e.g., sounding) frame 301 in step 500, which signals a beacon period and which may include some or all of the information about the network to announce the presence of a wireless LAN. Beacon frames may be transmitted by the Access Point (RD) periodically in, for example, a communication group, such as in an infrastructure BSS network, in which beacon generation is distributed among stations within the RD's communication group area (e.g., BSA). In some embodiments, the RD initiates the procedure by transmitting its sounding frame over a control period during which the SDs may perform time synchronization, power control, generating of a CQI list, and selecting subbands on which to transmit their respective feedback frames, including the SD's quality indicator. The RD may transmit the sounding frame through all subbands. These sounding frames may be used for determining a RSSI or other quality factor as discussed above with respect to FIG. 2c.

For a time period 302 following when the beacon is transmitted to the RD's associated SDs, the RD may revert to the default or minimum sensitivity (maximum guard zone) in step 502 by setting the receiver in the RD to a first sensitivity threshold. The first sensitivity threshold may, for example, be a predetermined fixed value stored in a memory of the SD. During time period 302 any SDs controlled to associate with the RD have a higher reliability towards associating with the RD and may do so in step 504 (e.g., by receiving from and/or exchanging with one or more SDs communications that includes association and/or association information). After duration 302, the RD may in step 506 estimate the quality of links on the channel (e.g., determine RSSI) between the associated SDs and the RD. Alternatively, this step may be performed during the period of beacon transmission or during period 302, and may be performed based on channel measurements performed based on the beacon transmission. After duration 302, the RD may in step 508 switch to a smaller guard zone footprint by setting the receiver in the RD to a second increased sensitivity (e.g., CCA) threshold, including optionally taking into account the RSSI of any newly associated SDs. The second sensitivity threshold may be based on the poorest quality link from among the qualities of links determined in step 506. For example, the SD which is the furthest from the RD from among the SDs in the communication group may have the poorest quality link due to its signals propagating the furthest to reach the RD. As such, the guard zone may be reduced in size to include the furthest SD and all those SDs which are closer to the RD. In another example, the second sensitivity threshold may be set to include within the guard zone at least an SD that has the poorest quality link due to having lower transmission power compared to other SDs within the communication group. In a further example, the second sensitivity threshold may be set to include within the guard zone at least an SD that has the poorest quality link due to having a signal propagation path that includes obstructions (e.g., hills, trees, rain, clouds, etc.) compared to other SDs within the communication group. In such cases of different transmission powers or propagation paths, the SDs will have different effective distances (e.g., from a signal quality perspective, the communication with the lower transmission power SDs or obstructed SDs will perform as if those SDs are further away compared to higher transmission power SDs or unobstructed SDs at the same actual distance from the RD). During the remaining duration 303, the RD receives uplink data transmissions from the associated or scheduled SDs in step 510. In step 510 during duration 303 the RD may also transmit downlink data and one or more of the associated or scheduled SDs may receive the downlink data.

Returning to FIG. 1, the SDs may include, for example, a mobile communication device 105, mobile phone 110, personal digital assistant (PDA) or mobile computer 120, computer work station (for example, personal computer (PC)) 115, or other portable or stationary device having a wireless interface capable of communicating with an access points 130 and 131. Network 100 may include wired and wireless connections and network elements, and connections over the networks may include permanent or temporary connections. Communication through the RDs 130 and 131 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a tablet computer, a radio broadcasting receiver, a set-top box (STB), a digital video recorder, a video game counsel, a remote control devices and the like.

While shown as a single network in FIG. 1 for simplicity, network 100 may include multiple networks that are interlinked so as to provide internetworked communications. Such networks may include one or more private or public packet-switched networks, for example the Internet, one or more private or public circuit-switched networks, for example a public switched telephone network, a satellite network, and/or a cellular network configured to facilitate communications to and from the SDs through one or more RDs. In various embodiments, an SD may perform the functions of an RD for other SDs.

Communication between the RDs and the SDs may include uplink transmissions (i.e., transmissions from an SD to the RD) and downlink transmissions (i.e., transmissions from the RD to one or more of the SDs). Uplink and downlink transmissions may utilize the same protocols or may utilize different protocols.

Any of the method steps, operations, procedures or functions described herein may be implemented using one or more processors and/or one or more memory in combination with machine executable instructions that cause the processors and other components to perform the method steps, procedures or functions. For example, as further described below, the SDs and RDs described herein may each include one or more processors and/or one or more memory in combination with executable instructions that cause each device/system to perform operations as described herein.

Figure 6:
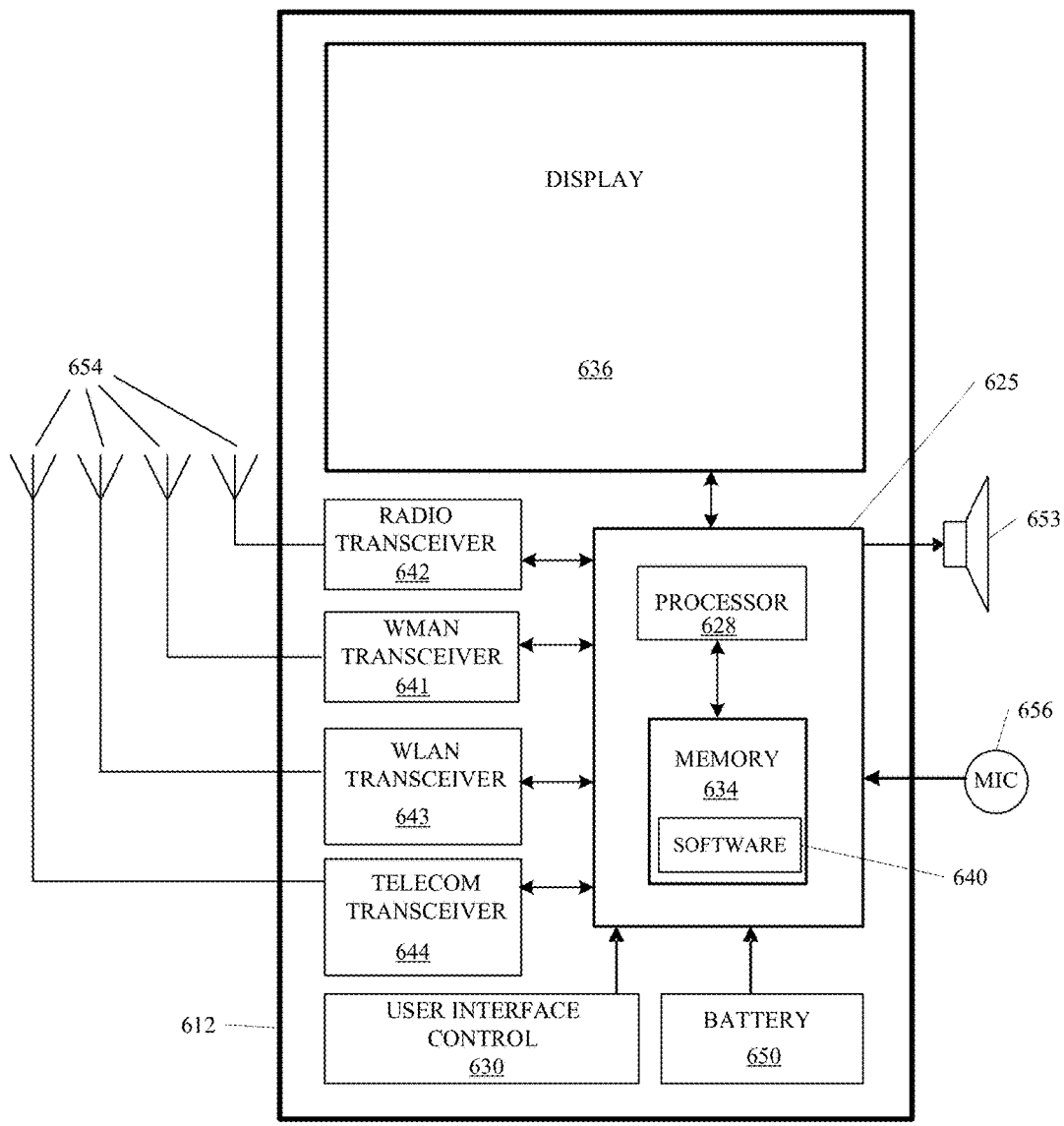
FIG. 6 illustrates a block diagram of an example communication device according to one or more embodiments described herein.

FIG. 6 illustrates an example apparatus, in particular a computing device 612, that may be used in a communication network such as the one illustrated in FIG. 1, to implement any or all of SDs and/or RDs described and illustrated herein. Computing device 612 may include a controller 625 connected to a user interface control 630, display 636 and other elements as illustrated. Controller 625 may include circuitry, such as for example one or more processors 628 and one or more memory 634 storing software 640, for example, client software, user interface software, server software, etc.

Device 612 may also include a battery 650 or other power supply device, speaker 653, and one or more antennae 654. Device 612 may include user interface circuitry, such as user interface control 630. User interface control 630 may include controllers or adapters, and other circuitry, configured to receive input from or provide output to a keypad, touch screen, voice interface—for example via microphone 656, function keys, joystick, data glove, mouse and the like. The user interface circuitry and user interface software may be configured to facilitate user control of at least some functions of device 612 though use of a display 636. Display 636 may be configured to display at least a portion of a user interface of device 612. Additionally, the display may be configured to facilitate user control of at least some functions of the device (for example, display 636 could be a touch screen).

Software 640 may be stored within memory 634 to provide instructions to processor 628 such that when the instructions are executed, processor 628, device 612 and/or other components of device 612 are caused to perform various functions or methods such as those described herein. The software may comprise machine executable instructions and data used by processor 628 and other components of computing device 612 may be stored in a storage facility such as memory 634 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

In various embodiments, the SDs may include software that is configured to coordinate the transmission and reception of information to and from other devices through the RDs, other SDs, and/or the network. In one arrangement, client (e.g., SD) software may include specific protocols for requesting and receiving content through the wireless network. Client software may include instructions that cause one or more components—for example, a processor, wireless interface, and/or a display of the SDs to perform various functions and methods including those described herein. The RDs may include similar software as the SDs.

Memory 634 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 628 (and any other processor or computer described herein) may include any of various types whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term 'circuitry' may refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

These examples of 'circuitry' apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device Device 612 or its various components may be mobile and be configured to receive, decode and process various types of transmissions including transmissions in a Wi-Fi networks according the IEEE 802.11 WLAN standards, (e.g., 802.11n, 802.11ac, etc.) and/or wireless metro area network (WMAN) standards (e.g., 802.16), through a specific one or more WLAN transceivers 643, WMAN transceivers 641. Additionally or alternatively, device 612 may be configured to receive, decode and process transmissions through various other transceivers, such as FM/AM Radio transceiver 642, and telecommunications transceiver 644.

Although the above description of FIG. 6 generally relates to a mobile device, other devices or systems may include the same or similar components and perform the same or similar functions and methods. For example, a computer communicating over a wired network connection (for example, PC 115 of FIG. 1) may include the components or a subset of the components described above, and may be configured to perform the same or similar functions as device 612 and its components.

Numerous other embodiments, modifications, and variations within the scope and spirit of the appended claims will occur to persons of ordinary skill in the art from a review of this disclosure and be recognized as being within the scope of the invention. For example, while the guard zones (e.g., sensitivity patterns) are illustrated as circles, persons of ordinary skill in the art will appreciate that the sensitivity patterns may take on other dimensions based on the environment such as geography (e.g., hills, valleys, etc.), weather conditions, and structures (e.g., buildings, walls, trees, etc.). The sensitivity patterns may further be designed/specified (e.g., through the use of multi-antenna or directional antenna devices, beamforming, etc.). Further the sensory patterns of different SDs and RDs may be designed to be different (e.g., one RD may be designed to cover a living room while an adjacent RD may be designed to cover a large backyard area).

Although specific examples of carrying out the invention have been described, those skilled in the art will appreciate that there are numerous variations and permutations of the above-described systems and methods that are contained within the spirit and scope of the invention as set forth in the appended claims. For example, carrying out the invention in some embodiments has been described in view of wireless local area networks, embodiments of the invention may be applied to various other wireless access systems. The various other wireless access systems may, for example, apply OFDM.

We claim:

1. A method comprising:
   transmitting, by an access point, a beacon message;
   setting, by the access point, a receiver of the access point to first and second sensitivity thresholds at which transmissions occurring on a wireless channel can be detected, wherein the access point is associated with two or more other apparatuses;
   detecting, by the access point, whether transmissions are occurring on the wireless channel with the receiver set to the first sensitivity threshold during a first period within a beacon period and with the receiver set to the second sensitivity threshold during a second period within the beacon period; and
   determining the second sensitivity threshold based on a poorest quality link amongst links between the access point and the two or more other apparatuses.

2. The method of claim 1, comprising:
   determining the first sensitivity threshold based on a stored default sensitivity threshold of the receiver.

3. The method of claim 1, comprising:
   receiving one or more quality indicators, each representing a quality of the wireless channel between a respective one of the two or more other apparatuses and the receiver; and
   determining the poorest quality link based on the one or more quality indicators.

4. The method of claim 1, comprising:
   associating one or more additional apparatuses with the access point in response to the receiver, when set to the first sensitivity threshold, receiving communications on the wireless channel from the one or more additional apparatuses.

5. The method of claim 4, comprising:
   receiving, with the receiver set to the second sensitivity threshold, uplink data transmissions from the two or more other apparatuses; and
   ignoring, with the receiver set to the second sensitivity threshold, transmissions on the wireless channel below the second sensitivity threshold.

6. The method of claim 5, comprising:
   performing the detecting with the receiver set to the first sensitivity threshold and the associating after the transmission of the beacon message; and
   performing the detecting with the receiver set to the second sensitivity threshold and the receiving of the uplink data transmissions after the associating.

7. The method of claim 5, wherein the second sensitivity threshold is higher than the first sensitivity threshold.

8. The method of claim 1, wherein the access point corresponds to a multi-station random access wireless network, and the two or more other apparatuses are comprised in stations that form a basic service set with the access point.

9. The method of claim 8, wherein the detecting during the first period comprises listening for transmissions from an overlapping basic service set.

10. An apparatus comprising:
    at least one processor; and
    at least one memory including computer program code;
    the at least one memory and the computer program code configured to, with the at least one processor, cause an access point at least to:
    transmit a beacon message;
    set a receiver of the access point to first and second sensitivity thresholds at which transmissions occurring on a wireless channel can be detected, wherein the access point is associated with two or more other apparatuses;
    detect whether transmissions are occurring on the wireless channel with the receiver set to the first sensitivity threshold during a first period within a beacon period and with the receiver set to the second sensitivity threshold during a second period within the beacon period; and
    determine the second sensitivity threshold based on a poorest quality link amongst links between the access point and the two or more other apparatuses.

11. The apparatus of claim 10, wherein the at least one memory and the computer program code are configured to, with the at least one processor, cause the access point at least to:
    determine the first sensitivity threshold based on a stored default sensitivity threshold of the receiver.

12. The apparatus of claim 10, wherein the at least one memory and the computer program code are configured to, with the at least one processor, cause the access point at least to:
    receive one or more quality indicators, each representing a quality of the wireless channel between a respective one of the one or more other apparatuses and the receiver; and
    determine the poorest quality link based on the one or more quality indicators.

13. The apparatus of claim 10, wherein the at least one memory and the computer program code are configured to, with the at least one processor, cause the access point at least to:
    associate one or more additional apparatuses with the access point in response to the receiver, when set to the first sensitivity threshold, receiving communications on the wireless channel from the one or more additional apparatuses.

14. The apparatus of claim 13, wherein the at least one memory and the computer program code are configured to, with the at least one processor, cause the access point at least to:

cause the receiver to receive, with the receiver set to the second sensitivity threshold, uplink data transmissions from the two or more other apparatuses; and cause the receiver to ignore, with the receiver set to the second sensitivity threshold, transmissions on the wireless channel below the second sensitivity threshold.

15. The apparatus of claim 14, wherein the at least one memory and the computer program code are configured to, with the at least one processor, cause the access point at least to:

cause the receiver to perform the detecting with the receiver set to the first sensitivity threshold and the associating after the transmitting of the beacon message; and cause the receiver to perform the detecting with the receiver set to the second sensitivity threshold and the receiving of the uplink data transmissions after the associating.

16. The apparatus of claim 10, further comprising the receiver, wherein the access point corresponds to a multi-station random access wireless network.

17. The apparatus of claim 16, wherein the at least one memory and the computer program code are configured to, with the at least one processor, cause the access point at least to:

cause the receiver to perform the detecting during the first period by listening for transmissions from an overlapping base station set.

* * * * *